US005880457A

United States Patent [19]

Tomiyama et al.

[11] Patent Number: 5,880,457

[45] Date of Patent: Mar. 9, 1999

[54] VOLTAGE DIVISION CIRCUIT FOR A PHOTOMULTIPLIER TUBE

[75] Inventors: Kimiyuki Tomiyama; Tsuyoshi Ema, both of Hamamatsu, Japan

[73] Assignee: Hamamatsu Photonics K.K., Shizuoka-ken, Japan

[21] Appl. No.: 876,514

[22] Filed: Jun. 16, 1997

[30] Foreign Application Priority Data

Jun. 14, 1996 [JP] Japan .................................... 8-154530

[51] Int. Cl.[6] ............................ G01T 1/208; H01J 40/14

[52] U.S. Cl. ........................................... 250/207; 313/535

[58] Field of Search ............................ 250/207, 214 VT, 250/363.02, 363.09; 313/105 R, 400, 535, 536; 315/383

[56] References Cited

U.S. PATENT DOCUMENTS

| | | | |
|---|---|---|---|
| 552,574 | 6/1896 | Gibbons | 250/207 |
| 3,580,684 | 5/1971 | Gordon | 250/207 |
| 4,367,404 | 1/1983 | Kaye | 250/207 |
| 4,820,914 | 4/1989 | Allen | 250/207 |
| 5,453,610 | 9/1995 | Gibbons | 313/535 |
| 5,512,755 | 4/1996 | Vickers et al. | 250/207 |

*Primary Examiner*—Stephone B. Allen
*Attorney, Agent, or Firm*—Sughrue, Mion, Zinn, Macpeak & Seas, PLLC

[57] ABSTRACT

A voltage division circuit for a photomultiplier tube in which an electron multiplication factor of the photomultiplier tube is readily changeable in a wide range with a low power consumption and without degrading a dynode's collection efficiency and an output linearity. The voltage division portion 100 divides a high voltage (−HV) at a fixed voltage division ratio determined by the resistance values of resistors 111 to 116, 121 and 122, and 131 to 134 to thereby generate voltages applied to a focusing electrode 820, dynodes 831, 832 and 836 to 838. Another voltage division portion 300 includes a variable resistor 332 and generates voltages applied to the dynodes 833 to 835 by dividing the high voltage at a variable voltage division ratio upon operating the variable resistor.

13 Claims, 6 Drawing Sheets

VOLTAGE DIVISION CIRCUIT FOR A PHOTOMULTIPLIER TUBE

BACKGROUND OF THE INVENTION

1. Field of the Invention

The present invention relates to a voltage division circuit for supplying high voltages to a photomultiplier tube.

2. Description of the Related Art

A photomultiplier tube is a photodetector with a large electron multiplication factor, wherein photoelectrons generated when light is incident on a photocathode are multiplied by multistage dynodes and the resultant electrons are extracted from an anode as a photo detection signal. Due to the large electron multiplication factor, the photomultiplier tubes have been extensively used in various fields such as a light measurement field to measure minute light.

In the light measurement, (i) a single photomultiplier tube is used to detect whether or not light is received or to detect an amount of light received, and (ii) a number of photomultipliers are used in conjunction with position CTs (Computer Tomography), gamma cameras, TOFs (Time Of Flight) and the like.

A voltage is applied between the photocathode and the first-stage dynode and also between the succeeding dynodes to activate the photomultiplier tubes. To this effect, a voltage division circuit is employed in which a high voltage applied thereto is subjected to a voltage division to generate voltages to be applied to the photocathode and the respective dynodes.

FIG. 4 is a circuit diagram showing a conventional, very basic voltage division circuit. As shown therein, the voltage division circuit includes a serially-connected resistor array 910 in which a plurality of resistor elements $\mathbf{910}_1$ through $\mathbf{910}_{N+2}$ are connected in series. A high voltage applied between both terminals of the resistor array 910 is divided by the respective resistor values. Divided voltages are applied to the photocathode 991, focusing electrode 992, and dynodes $\mathbf{993}_1$ through $\mathbf{993}_N$ of the photomultiplier tube 990.

The electron multiplication factor in the photomultiplier tube changes depending on the voltages applied thereto. Further, the electron multiplication factors change for different photomultiplier tubes even if the same voltages were applied between the photocathode and the first-stage dynode and between the succeeding dynodes.

When a single photomultiplier tube is used as described in (i) mentioned above, it is required that the electron multiplication factor be controlled depending on a predicted amount of incident light from the subject to be measured so that the output from the photomultiplier tube may not be saturated. When a number of photomultiplier tubes are used at a time as described in (ii) mentioned above, it is desirable that the electron multiplication factors of all the photomultiplier tubes be approximately equal to one another. Equal electron multiplication factors facilitate configuration of amplifiers to be provided following the photomultiplier tubes in terms of processing photo detection signals output from the photomultiplier tubes.

It has conventionally been proposed to change the level of the high voltage applied to the voltage division circuit or to change the voltage division ratio in the voltage division circuit to change the electron multiplication factor in an individual photomultiplier tube. When changing the electron multiplication factor by such a method, attention should be drawn to the fact that a dynode's collection efficiency, which is a probability in which the photoelectrons emitted from the photocathode enter the first stage dynode, relies upon the voltage applied between the photocathode and the first dynode. FIG. 5 is a graphical representation showing that the dynode's collection efficiency relies upon the voltage applied between the photocathode and the first-stage dynode. As is apparent from FIG. 5, it is required that the voltage applied between the photocathode and the first-stage dynode be maintained at a level higher than a predetermined value in order to maintain the dynode's collection efficiency at a high level.

In view of the foregoing, there have been proposed the following voltage division circuits. One type of the voltage division circuit maintains the voltage applied between the photocathode and the first-stage dynode at a constant level and changes the high voltage applied to the voltage division circuit. Another type of the voltage division circuit changes the voltage division ratio to thus change the electron multiplication factor of the individual photomultiplier tubes.

FIG. 6 shows a conventional voltage division circuit disclosed in Japanese Laid-Open Patent Publication (Kokai) No. HEI-7-142024. The circuit shown therein includes Zener diodes which are used to maintain the voltage applied between the photocathode and the first-stage dynode at constant. In this circuit, a variable resistor 921, Zener diodes 922, 923 and resistor elements $\mathbf{924}_1$ through $\mathbf{924}_N$ are connected in series. The Zener diodes 922 and 923 maintain the voltages between the photocathode 991 and a focusing electrode 992 and between the focusing electrode 992 and the first-stage dynode $\mathbf{993}_1$, respectively. As such, the voltage between the photocathode 991 and the first-stage dynode $\mathbf{993}_1$ is maintained at constant by virtue of the Zener diodes 922 and 923, thereby remaining the dynode's collection efficiency unchanged. To change the electron multiplication factor of the photomultiplier tube, the resistance value of the variable resistor 921 is changed to change the voltage applied between the adjacent two electrodes of the photocathode 991 and the dynodes $\mathbf{993}_1$ through $\mathbf{993}_N$.

FIG. 7 shows another conventional voltage division circuit disclosed in Japanese Laid-Open Patent Publication (Kokai) No. HEI-7-142024. This circuit uses a constant voltage source to maintain the voltage between the photocathode and the first-stage dynode at constant. This circuit includes a first serially-connected circuit consisting of a first constant voltage source 931, a second constant voltage source 932, and resistor elements $\mathbf{993}_1$ through $\mathbf{993}_N$, and a second serially-connected circuit consisting of resistor elements $\mathbf{934}_1$ through $\mathbf{934}_N$, wherein the first and second serially-connected circuits are connected in parallel to each other. The resistor elements $\mathbf{993}_1$ through $\mathbf{993}_N$ are provided in one-to-one correspondence to the resistor elements $\mathbf{934}_1$ through $\mathbf{934}_N$ so that the resistor element $\mathbf{993}_1$ correspond to the resistor element $\mathbf{994}_1$. Switches $\mathbf{935}_1$ through $\mathbf{935}_{N+1}$ are connected between terminals of the corresponding resistors. A high voltage is applied between the two terminals of the resistor array $\mathbf{993}_1$ through $\mathbf{993}_N$.

In the voltage division circuit shown in FIG. 7, the constant voltage sources 931 and 932 maintain the voltages between the photocathode 991 and the focusing electrode 992 and between the focusing electrode 992 and the first-stage dynode $\mathbf{993}_1$, respectively. That is, the voltage between the photocathode 991 and the first-stage dynode $\mathbf{993}_1$ is maintained at constant to thereby maintain the dynode's collection efficiency. By individually performing on-off actions of the switches $\mathbf{935}_1$ through $\mathbf{935}_{N+1}$, the electron multiplication factor of the photomultiplier tube 990 is changed.

The conventional voltage division circuits as described above contain the following disadvantages.

In the voltage division circuit disclosed in Japanese Laid-Open Publication No. HEI-7-142024, the Zener diode generates non-negligible noises when the current flowing therein is less than several hundreds microamperes. In order to operate the circuit without introducing unwanted Zener noises, it is required that a current more than several hundreds microamperes be flowed in the Zener diode at all times. This results in a large consumption power in the photomultiplier tube.

In the prior art described above, the voltage between the photocathode and the N-th dynode, that is, the voltage between the photocathode and the anode is changed to change the electron multiplication factor. However, a range of linearity of the anode current relative to the amount of incident light becomes narrow when the voltage between the photocathode and the anode is lowered. Therefore, the output linearity is degraded when the electron multiplication factor is lowered.

Japanese Laid-Open Patent Publication No. HEI-7-142024 is not involved with the above-described problems. Instead, a complicated operation is required to change the electron multiplication factor due to the provision of a large number of switches.

SUMMARY OF THE INVENTION

The present invention has been made in view of the foregoing, and it is an object of the invention to provide a voltage division circuit for a photomultiplier tube in which an electron multiplication factor of the photomultiplier tube is readily changeable in a wide range with a low power consumption without degrading a dynode's collection efficiency and an output linearity.

To achieve the above and other objects, there is provided a voltage division circuit for a photomultiplier tube. The photomultiplier tube includes a photocathode, a first dynode portion, a second dynode portion, a third dynode portion, and an anode. The photocathode emits photoelectrons in response to light incident thereon. The first dynode portion has at least one dynode, and receives the photoelectrons emitted from the photocathode, multiplies the photoelectrons and emits multiplied photoelectrons. The second dynode portion has at least one dynode, and receives the multiplied photoelectrons emitted from the first dynode portion, multiplies the multiplied photoelectrons and emits further multiplied photoelectrons. The third dynode portion has two or more dynodes, and receives the multiplied photoelectrons emitted from the second dynode portion and emits further multiplied photoelectrons. The anode receives the further multiplied photoelectrons emitted from the third dynode portion. The voltage division circuit supplies relevant voltages to the photocathode, the first dynode portion, the second dynode portion, and the third dynode portion, and includes a first voltage division portion and a second voltage division portion. The first voltage division portion is applied with a first side potential and a second side potential higher in voltage than the first side potential defining a high voltage and outputs voltages applied to the first dynode portion and the third dynode portion upon voltage dividing the high voltage at a predetermined voltage division ratio. The second voltage division portion is applied with the first side potential and the second side potential of the high voltage and outputs a voltage applied to the second dynode portion upon voltage dividing the high voltage at a variable voltage division ratio.

Preferably, the first voltage division portion is made up of a first resistor array, a second resistor array, and a third resistor array. The first resistor array includes a first number of resistors connected in series. The first resistor array has a first terminal connected to the photocathode, a second terminal, and at least one terminal connected to the at least one dynode in the first dynode portion. The second resistor array includes a second number of resistors connected in series. The second resistor array has a first terminal connected to the second terminal of the first resistor array, and a second terminal. The third resistor array includes a third number of resistors connected in series. The third resistor array has a first terminal connected to the second terminal of the second resistor array, terminals connected respectively to the two or more dynodes of the third dynode portion, and a second terminal connected to the second side potential of the high voltage.

Preferably, the first voltage division portion includes a first resistor array, a second resistor array, a third resistor array, and a predetermined number of transistors. The first resistor array includes a first number of resistors connected in series. The first resistor array has a first terminal connected to the photocathode, a second terminal, and at least one terminal connected to the at least one dynode in the first dynode portion. The second resistor array includes a second number of resistors connected in series. The second resistor array has a first terminal connected to the second terminal of the first resistor array, and a second terminal. The third resistor array includes a third number of resistors connected in series. The third resistor array has a first terminal connected to the second terminal of the second resistor array, and a second terminal connected to the second side potential of the high voltage. The predetermined number of transistors are provided to pass a voltage developed across the third dynode portion and voltages determined by the third resistor array to a predetermined number of dynodes closer in position to the anode. The predetermined number of transistors also bypass currents flowing in the predetermined number of dynodes.

The predetermined number of transistors are either bipolar transistors or field effect transistors.

Preferably, the second voltage division portion includes a fourth resistor array, a fifth resistor array, a variable resistor portion, and a sixth resistor array. The fourth resistor array includes the first number of resistors connected in series. The fourth resistor array has a first terminal connected to the photocathode, and a second terminal. The fifth resistor array includes the second number of resistors connected in series. The fifth resistor array has a first terminal connected to the second terminal of the fourth resistor array, terminals connected to the at least one dynode in the second dynode portion, and a second terminal. The variable resistor portion has a first terminal connected to the second terminal of the fourth resistor array, and a second terminal. The variable resistor portion is connected in parallel to the fifth resistor array. The sixth resistor array includes the third number of resistors connected in series. The sixth resistor array has a first terminal connected to both the second terminal of the fifth resistor array and the second terminal of the variable resistor portion, and a second terminal connected to the second side potential of the high voltage.

According to another aspect of the present invention, there is provided a voltage division circuit for a photomultiplier tube. The voltage division circuit includes a first voltage division portion and a second voltage division portion. The first voltage division portion is applied with a first side potential and a second side potential higher in voltage than the first side potential defining a high voltage and outputs voltages applied to the first dynode portion, the third dynode portion, and more than one predetermined dynodes in the second dynode portion excluding a first-stage dynode and a final-stage dynode in the second dynode portion upon voltage dividing the high voltage at a predetermined voltage division ratio. The second voltage division portion is applied with a voltage output from the first voltage division portion and the second side potential of the high voltage and outputs voltages applied to dynodes in the second dynode portion other than the more than one predetermined dynodes upon voltage dividing the high voltage at a variable voltage division ratio.

The first voltage division portion generates a voltage applied to a dynode disposed substantially at a center in the second dynode portion.

Preferably, the first voltage division portion includes a first resistor array, a second resistor array, and a third resistor array. The first resistor array includes a first number of resistors connected in series. The first resistor array has a first terminal connected to the photocathode, a second terminal, and at least one terminal connected to the at least one dynode in the first dynode portion. The second resistor array includes a second number of resistors connected in series. The second resistor array has a first terminal connected to the second terminal of the first resistor array, a terminal connected to the predetermined dynode in the second dynode portion, and a second terminal. The third resistor array includes a third number of resistors connected in series. The third resistor array has a first terminal connected to the second terminal of the second resistor array, terminals connected respectively to the two or more dynodes of the third dynode portion, and a second terminal connected to the second side potential of the high voltage.

Preferably, the first voltage division portion includes a first resistor array, a second resistor array, a third resistor array, and a predetermined number of transistors. The first resistor array includes a first number of resistors connected in series. The first resistor array has a first terminal connected to the photocathode, a second terminal, and at least one terminal connected to the at least one dynode in the first dynode portion. The second resistor array includes a second number of resistors connected in series. The second resistor array has a first terminal connected to the second terminal of the first resistor array, a terminal connected to the predetermined dynode in the second dynode portion, and a second terminal. The third resistor array includes a third number of resistors connected in series. The third resistor array has a first terminal connected to the second terminal of the second resistor array, and a second terminal connected to the second side potential of the high voltage. The predetermined number of transistors are provided to pass a voltage developed across the third dynode portion and voltages determined by the third resistor array to a predetermined number of dynodes closer in position to the anode, and bypass currents flowing in the predetermined number of dynodes.

The predetermined number of transistors are either bipolar transistors or field effect transistors.

Preferably, the second voltage division portion includes a fourth resistor array, a fifth resistor array, a variable resistor portion, and a sixth resistor array. The fourth resistor array includes the first number of resistors connected in series. The fourth resistor array has a first terminal connected to the photocathode, and a second terminal. The fifth resistor array includes the second number of resistors connected in series. The fifth resistor array has a first terminal connected to the second terminal of the fourth resistor array, terminals connected to dynodes in the second dynode portion other than the predetermined dynode, and a second terminal. The variable resistor portion has a first terminal connected to the second terminal of the fourth resistor array, and a second terminal. The variable resistor portion is connected in parallel to the fifth resistor array. The sixth resistor array includes the second number of resistors connected in series. The sixth resistor array has a first terminal connected to both the second terminal of the fifth resistor array and the second terminal of the variable resistor portion, and a second terminal connected to the second side potential of the high voltage.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

Figure 1:
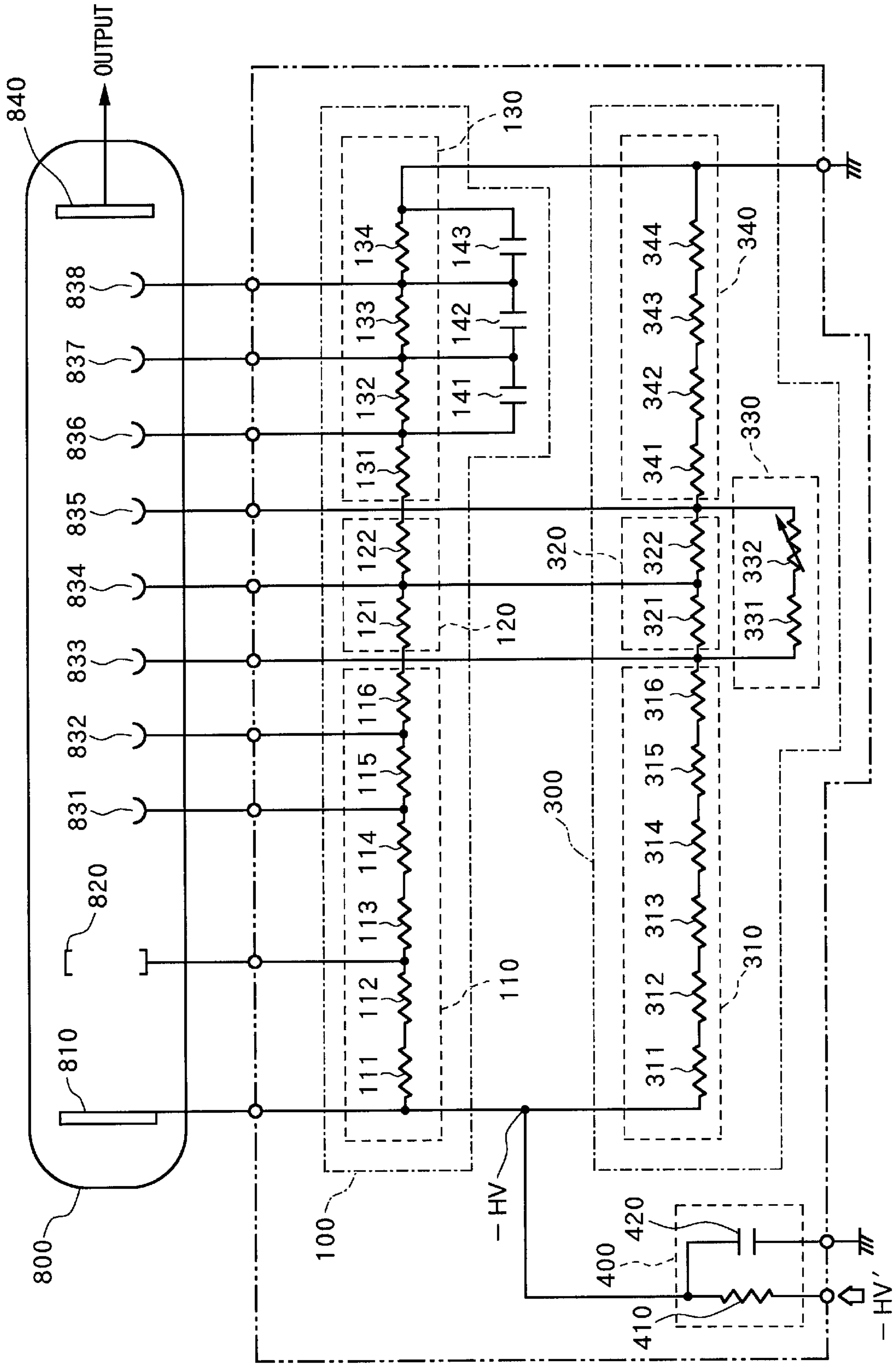
FIG. 1 is a circuit diagram showing a voltage division circuit for a photomultiplier tube according to a first embodiment of the present invention.

Various embodiments of the present invention will be described with reference to the accompanying drawings wherein like parts are designated by like reference numerals to avoid duplicate description.

FIG. 1 is a circuit diagram showing a voltage division circuit for a photomultiplier tube according to a first embodiment of the invention. The voltage division circuit according to this embodiment is designed to apply a negative high voltage (−HV) to a photocathode 810 relative to an anode 840 which is at a ground potential. The photomultiplier tube 800 includes a focusing electrode 820 and eight dynodes 831 to 838 disposed along the electron acceleration pathway between the photocathode 810 and the anode 840. As shown in FIG. 1, the voltage division circuit includes (a) a voltage division portion 100 and (b) a voltage division portion 300. The voltage division portion 100 is inputted with a ground potential and the negative potential of a negative high voltage to be applied to the photocathode 810. The voltage division portion 100 outputs at a predetermined division ratio electrical potentials to be supplied to the focusing electrode 820, the dynodes 831, 832, which serve as a first dynode portion, and the dynodes 836 through 838, which serve as a third dynode portion. The voltage division portion 300 is inputted with the ground potential and the negative potential of the negative high voltage to be applied to the photocathode 810, and supplies at a variable division ratio an electric potential supplied to the dynodes 833 to 835, which serve as a second dynode portion.

The voltage division circuit further includes a high voltage input portion 400 having a resistor element 410 and a bypass capacitor 420. The resistor element 410 has a first terminal to which the negative potential of the negative high voltage (−HV') is applied from an external source, and a second terminal connected to the voltage division portion 100 and the voltage division portion 300. The bypass capacitor 420 has a first terminal connected to ground and a second terminal connected to the second terminal of the resistor element 410. It should be noted that the resistance value of the resistor element 410 is selected to be a value sufficient smaller than the combined resistance of the resistance value of the voltage division portion 100 and the resistance value of the voltage division portion 300. As a result, when a high voltage (−HV') is applied to the voltage division circuit, then a high voltage (−HV) is applied between the photocathode and the anode. In the actuality, −HV=−HV'.

The voltage division portion 100 includes a first resistor array 110 having resistors 111 to 116 connected in series, a second resistor array 120 having resistors 121 to 122 connected in series, and a third resistor array 130 having resistors 131 to 134 connected in series. The first resistor array 110 has the first terminal electrically connected to the photocathode 810 and terminals electrically connected to the focusing electrode 820 and the dynodes 831, 832, respectively. The second resistor array 120 has a first terminal connected to the second terminal of the first resistor array 110, and second terminal. The third resistor array 130 has a first terminal connected to the second terminal of the second resistor array 120, a second terminal connected to ground, and terminals to be connected to the dynodes 836 to 838. The voltage division portion 130 further includes transient current supplying capacitors 141, 142 and 143 connected in parallel to corresponding ones of the resistors 131, 132, 134.

The voltage division portion 300 includes a first resistor array 310 having resistors 311 to 316 connected in series, a second resistor array 320 having resistors 321 and 322 connected in series, a variable resistor portion 330 connected in parallel to the second resistor array 320, and a resistor array 340 having resistors 341 through 344 connected in series. The first resistor array 310 has a first terminal electrically connected to the photocathode 810, and a second terminal. The second resistor array 320 has a first terminal connected to the second terminal of the first resistor array 310, and a second terminal. The second resistor array 320 has terminals electrically connected to the dynodes 833 to 835. The variable resistance portion 330 has a first terminal connected to the second terminal of the first resistor array 310. The third resistor array 340 has a first terminal connected to the second terminal of the variable resistance portion 330 and to the second terminal of the second resistor array 320. The second terminal of the third resistor array 340 is connected to ground.

The variable resistor portion 330 includes a resistor 331 and a variable resistor 332 connected in series.

When a high voltage (−HV') is applied to the voltage division circuit, the high voltage (−HV) is applied between both terminals of the voltage division portion 100 and both terminals of the voltage division portion 300. The voltage division portion 100 and the voltage division portion 300 separately divide the high voltage (−HV).

The voltage division portion 100 divides the high voltage (−HV) in a fixed manner determined by the resistance values of the resistors 111 to 116, 121, 122, and 131 through 134. The voltage division portion 100 generates fixed potentials supplied to the focusing electrode 820, the dynodes 831, 832, and the dynodes 836 to 838. That is, assuming that the resistance value of the first resistor array 110 is R11, the resistance values of the second resistor array 120 is R12, and the resistance value of the third resistor array 130 is R13, then a voltage V11 developed between the terminals of the first resistor array 110, a voltage V12 developed between the terminals of the second resistor array 120, and a voltage V13 developed between the terminals of the third resistor array 130 are fixed values determined by the following equations.

$$V11=(-HV)\times R11/(R12+R12+R13) \quad (1)$$

$$V12=(-HV)\times R12/(R11+R12+R13) \quad (2)$$

$$V13=(-HV)\times R13/(R11+R12+R13) \quad (3)$$

The voltages V11, V12, and V13 are divided in a fixed manner by the first resistor array 110, the second resistor array 120, and the third resistor array 130.

As a result, a fixed voltage is developed between the photocathode 810 and the dynodes 831 which is the first-stage dynode nearest the photocathode 810. Thus, the dynode's collection efficiency can be maintained at a fixed level and the voltage developed between the photocathode 810 and the anode 840 can be also maintained at a fixed level. Therefore, electron multiplication can be carried out with a fixed range of linearity of the anode current.

The voltage division portion 300 also divides the high voltage. However, the voltage division portion 300 divides the voltage in a variable manner. That is, assuming the voltage value of the first resistor array 310 is R31, the combined resistance of the second resistor array 320 and the variable resistor portion 330 is R32, and the resistance value of the third resistor array 340 is R33, then a voltage V31 developed between the terminals of the first resistor array 310, a voltage V32 developed between the terminals of the second resistor array 320, and a voltage V33 developed between the terminals of the variable resistor portion 330 can be determined using the following equations.

$$V31=(-HV)\times R31/(R31+R32+R33) \quad (4)$$

$$V32=(-HV)\times R32/(R31+R32+R33) \quad (5)$$

$$V33=(-HV)\times R33/(R31+R32+R33) \quad (6)$$

Resistance value R32 varies by operation of the variable resistor portion 332. Accordingly, the voltages V31, V32, and V33 vary in accordance with equations (4) through (6).

As a result, a voltage VD23 between the dynode 832 and the dynode 833, a voltage VD24 between the dynode 833 and the dynode 834, a voltage VD45 between the dynode 834 and the dynode 835, and a voltage VD56 between the dynode 835 and the dynode 836, are all vary. By varying the voltage between the dynodes, the electron multiplication factor of the photomultiplier tube 800 varies.

By using the voltage division circuit as described above to supply voltage to the photomultiplier tube, by merely operating the variable resistor portion, the electron multiplication factor of the photomultiplier tube can be greatly changed without changing dynode's collection efficiency or the output linearity.

Further, because the voltage division portion 300 supplies voltage to the dynodes 833 to 835, which are middle stages along the accelerated multiplication pathway of the photomultiplier tube 800, the dynode current at a time of electron multiplication is small. Therefore, the value of the direct current resistance component of the voltage division portion 300 can be set to a relatively large value in order to maintain electric potential of the dynodes. Accordingly, increase in the consumed power caused by adding the voltage division portion 300 can be reduced.

A second embodiment of the present invention will next be described with reference to FIG. 2.

Figure 2:
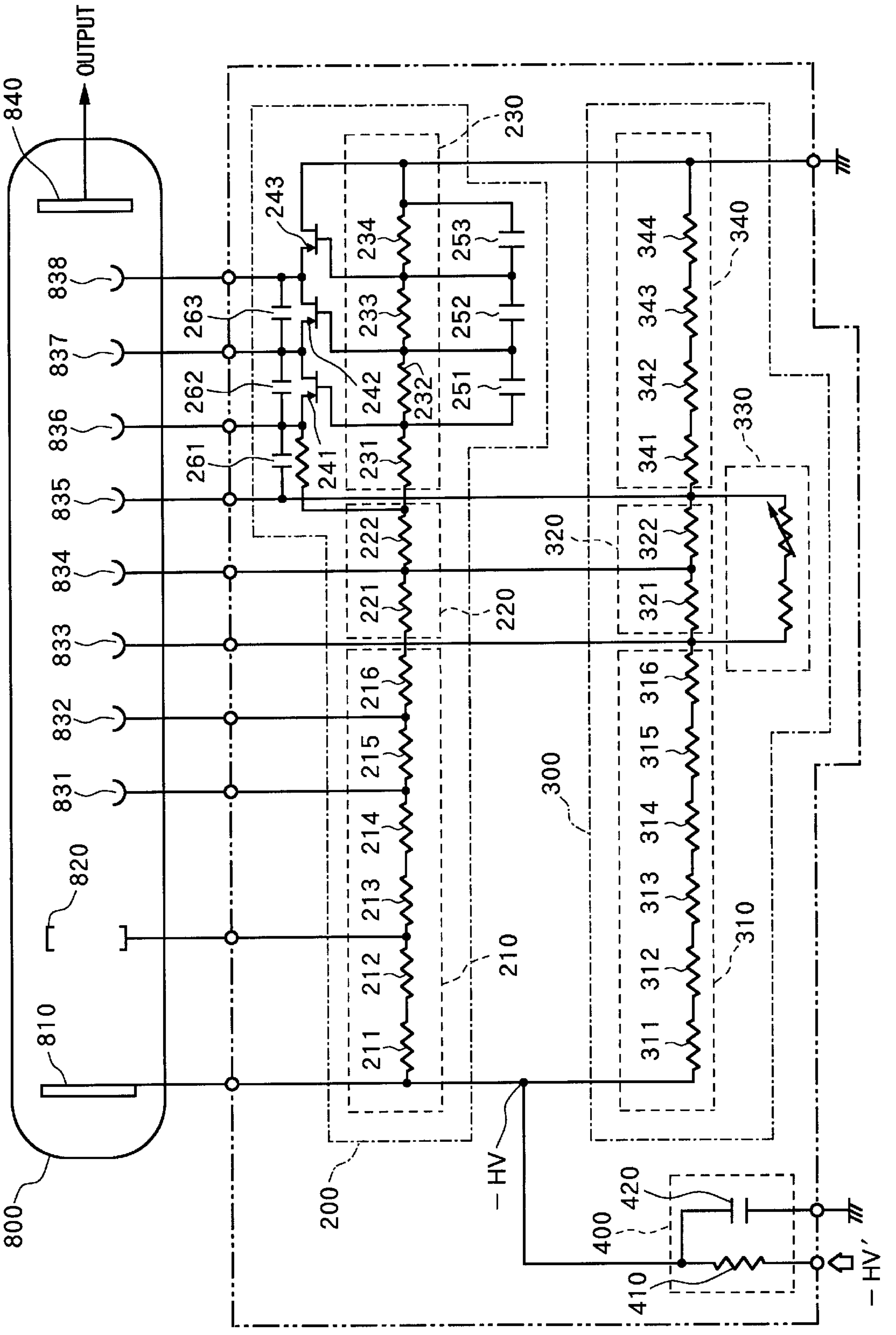
FIG. 2 is a circuit diagram showing a voltage division circuit for a photomultiplier tube according to a second embodiment of the present invention.

FIG. 2 is a circuit diagram showing a voltage division circuit for a photomultiplier. It should be noted that the voltage division circuit according to the second embodiment is similar to the voltage division circuit of the first embodiment. However, the voltage division circuit of the second embodiment differs from the voltage division circuit of the first embodiment in that a voltage division portion 200 is used instead of the voltage division portion 100.

The voltage division portion 200 includes a first resistor array 210 having resistors 211 to 216 connected in series, a second resistor array 220 having resistors 221 to 222 connected in series, and a third resistor array 230 having resistors 231 to 234 connected in series. The first resistor array 210 has the first terminal electrically connected to the photocathode 810 and terminals electrically connected to the focusing electrode 820 and the dynodes 831, 832, respectively. The second resistor array 220 has a first terminal connected to the second terminal of the first resistor array 210, and second terminal. The third resistor array 230 has a first terminal connected to the second terminal of the second resistor array 220, a second terminal connected to ground, and terminals to be connected to the dynodes 836 to 838. The voltage division portion 200 further includes field effect transistors (FET) 241 to 243. The FETs 241 to 243 transmit a voltage determined by the resistor array 230 and a voltage between both terminals of the resistor array 230 to the dynodes 836 to 838. The FETs 241 to 243 are also connected in series. The FETs 241 to 243 bypass electric current generated at dynodes 836 to 838. The voltage division portion 200 also includes capacitors 251, 252, 253, a resistor 250, and capacitors 261, 262, 263. The capacitors 251, 252, 253 are for supplying transient current and connected in parallel with corresponding ones of the resistors 232, 233, 234. The resistor 250 has a first terminal connected to the first terminal of the resistor array 230, and a second terminal connected to the FETs 241. The capacitors 261, 262, 263 are connected in parallel with the FETs 241 to 243.

When a high voltage (−HV') is applied to the voltage division circuit, a high voltage (−HV) is applied to both terminals of the voltage division portion 200 and the both terminals of the voltage division portion 300. Therefore, the voltage division portion 200 and the voltage division portion 300 separately divide the high voltage (−HV).

The voltage division portion 200 divides the high voltage (−HV) in a fixed manner determined by the resistance value R21 of the resistor array 210, the resistance value R22 of the resistor array 220, and the composite resistance value R23 of the resistor array 230, the resistor 250, and the FETs 241 to 243. Assuming that the voltage developed between the two terminals of the resistor array 210 is V21, the voltage developed between the two terminals of the resistor array 220 is V22, and the voltage developed between the two terminals of the resistor array 230 is V23, then the following relationship is established:

$$V21=(-HV)\times R21/(R21+R22+R23) \quad (7)$$

$$V22=(-HV)\times R22/(R21+R22+R23) \quad (8)$$

$$V23=(-HV)\times R23/(R21+R22+R23) \quad (9)$$

The voltages V21, V22, and V23 are divided in a fixed manner by a resistor configured by the resistor array 210, 220, and 230. The voltage divided by the resistors 231 to 234 of the resistor array 230 is inputted into the gate terminal of the each of the FETs 241 to 243 and supplied to the dynodes 836 to 838 via the source terminals. When the electrons are multiplied, the generated current passes between the source and the drain of the FETs 241 to 243 and bypasses the resistor array 230. As a result, fixed electric potential can be maintained at the dynodes 836 to 838 without being influenced by the amount generated during electric multiplication and flowing from the dynodes to the drains of the FETs.

As a result, the breeder current can be one fifth the amount compared with a resistor is formed to have uniform linear output as in the first embodiment. Therefore, consumption of power can be reduced.

As a result, a fixed voltage is developed between the photocathode 810 and the dynodes 831 which is the first-stage dynode nearest the photocathode 810. Thus, the dynode's collection efficiency can be maintained at a fixed level and the voltage developed between the photocathode 810 and the anode 840 can be also maintained at a fixed level. Therefore, electron multiplication can be carried out with a fixed range of linearity of the anode current.

The operation of the voltage division portion 300 is the same as that described in the first embodiment.

By using the voltage division circuit as described above to supply voltage to the photomultiplier tube, by merely operating the variable resistor portion, the electron multiplication factor of the photomultiplier tube can be greatly changed without changing dynode's collection efficiency or the output linearity.

Further, because the voltage division portion 300 supplies voltage to the dynodes 833 to 835, which are middle stages along the accelerated multiplication pathway of the photomultiplier tube 800, the dynode current at a time of electron multiplication is small. Therefore, the value of the direct current resistance component of the voltage division portion 300 can be set to a relatively large value in order to maintain electric potential of the dynodes. Accordingly, increase in the consumed power caused by adding the voltage division portion 300 can be reduced.

A third embodiment of the present invention will be described with reference to FIG. 3.

Figure 3:
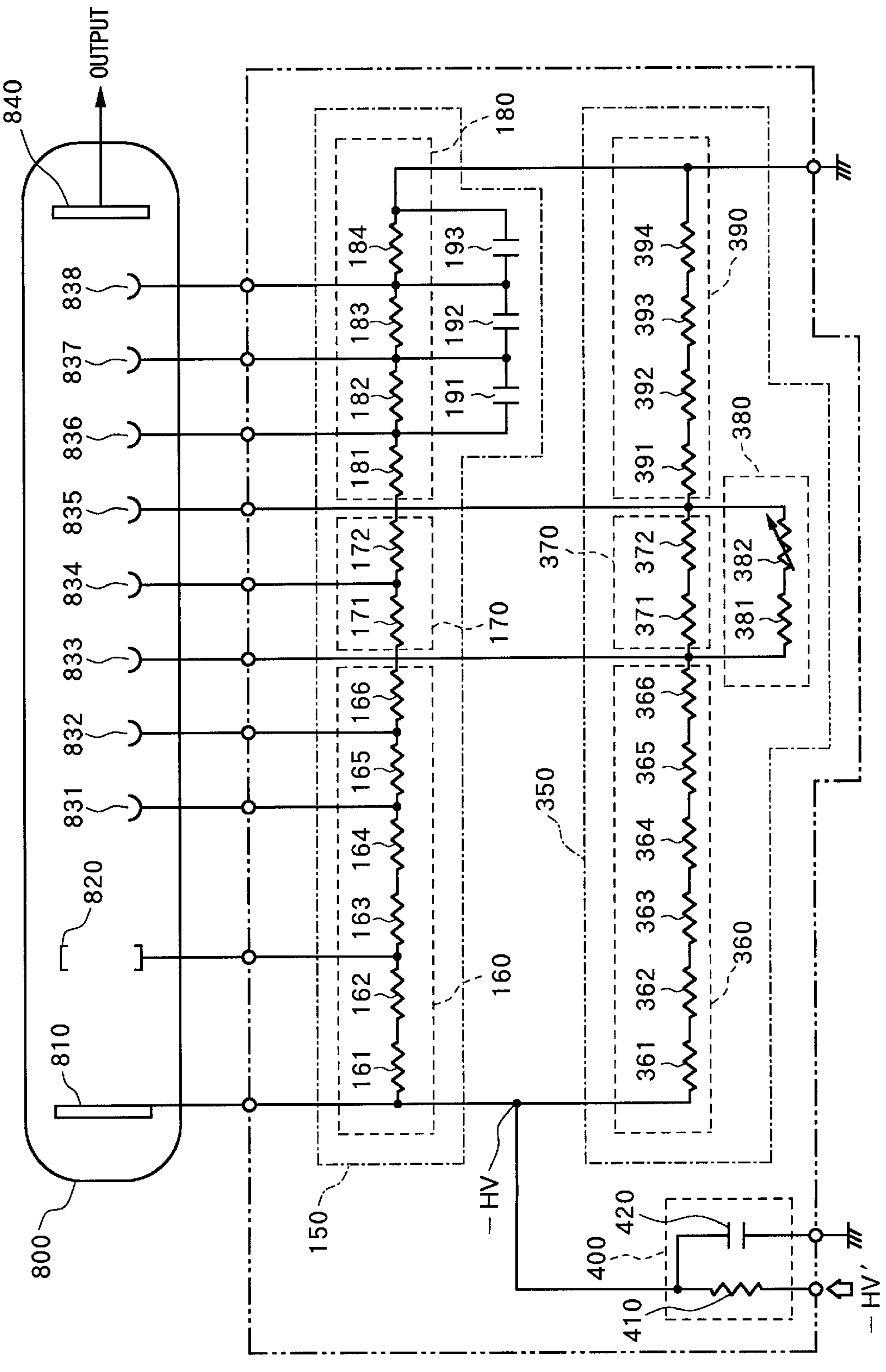
FIG. 3 is a circuit diagram showing a voltage division circuit for a photomultiplier tube according to a third embodiment of the present invention.
Figure 4:
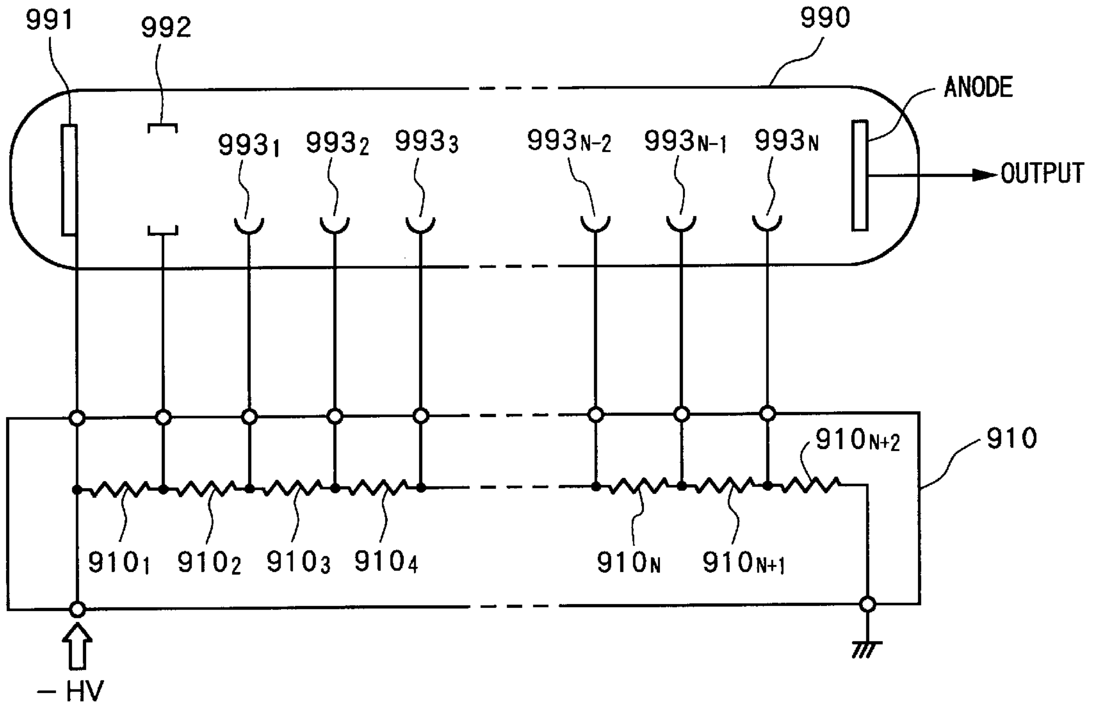
FIG. 4 is a circuit diagram showing a conventional voltage division circuit for a photomultiplier tube in which an electron multiplication factor is fixed.
Figure 5:
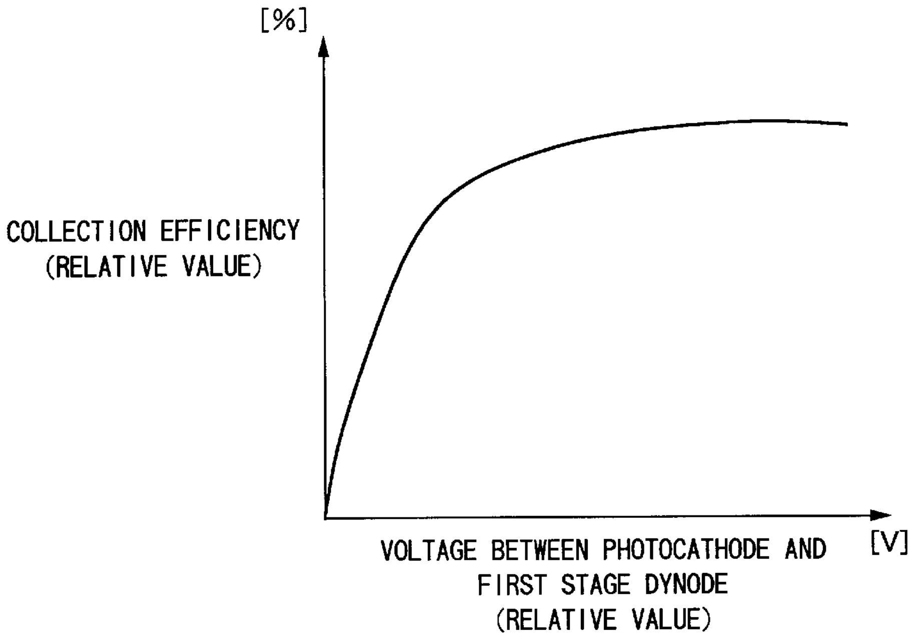
FIG. 5 is a graphical representation showing a relationship between a voltage applied between photocathode and first-stage dynode and a dynode's collection efficiency.
Figure 6:
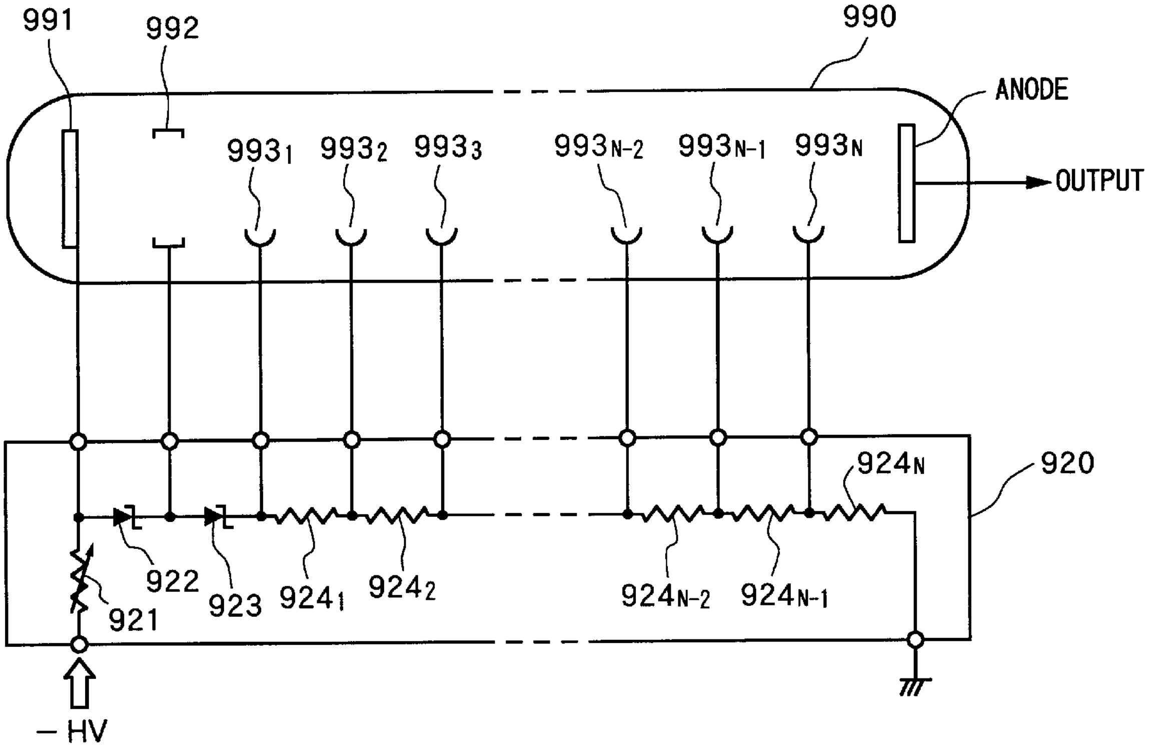
FIG. 6 is a circuit diagram showing another conventional voltage division circuit for a photomultiplier tube in which an electron multiplication factor is variable.
Figure 7:
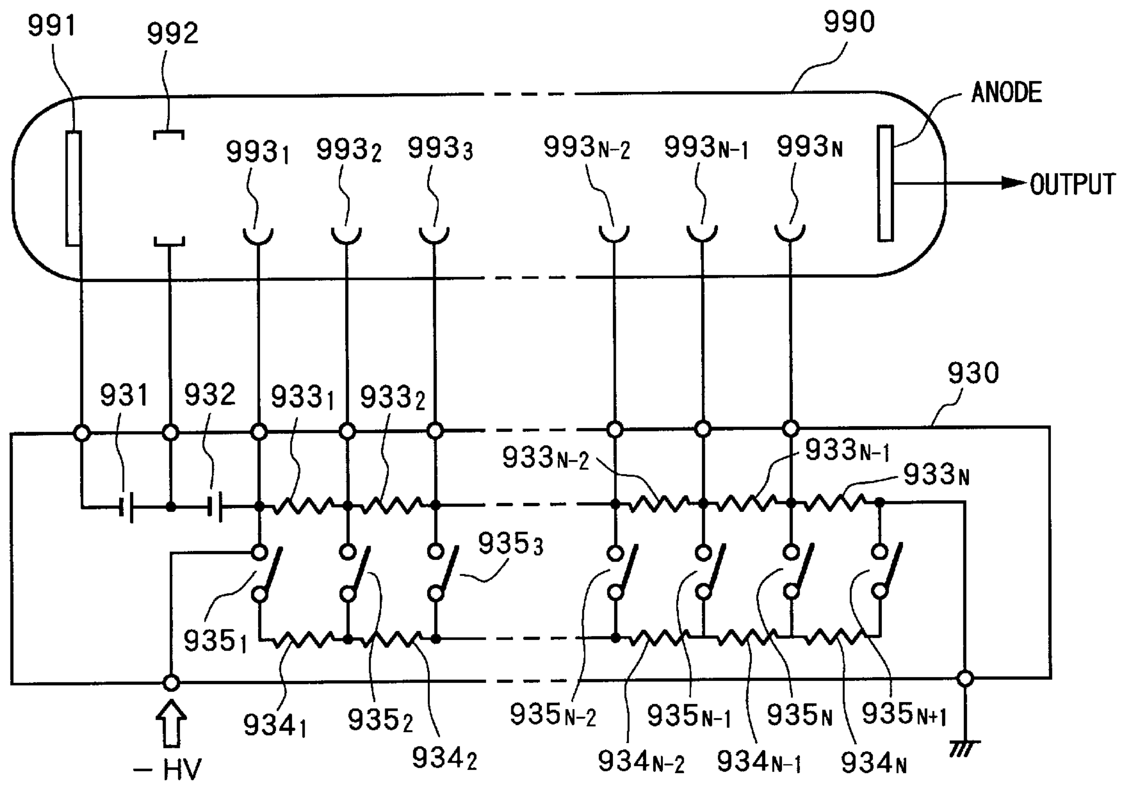
FIG. 7 is a circuit diagram showing still another conventional voltage division circuit for a photomultiplier tube in which an electron multiplication factor is also variable.
Figure 2:
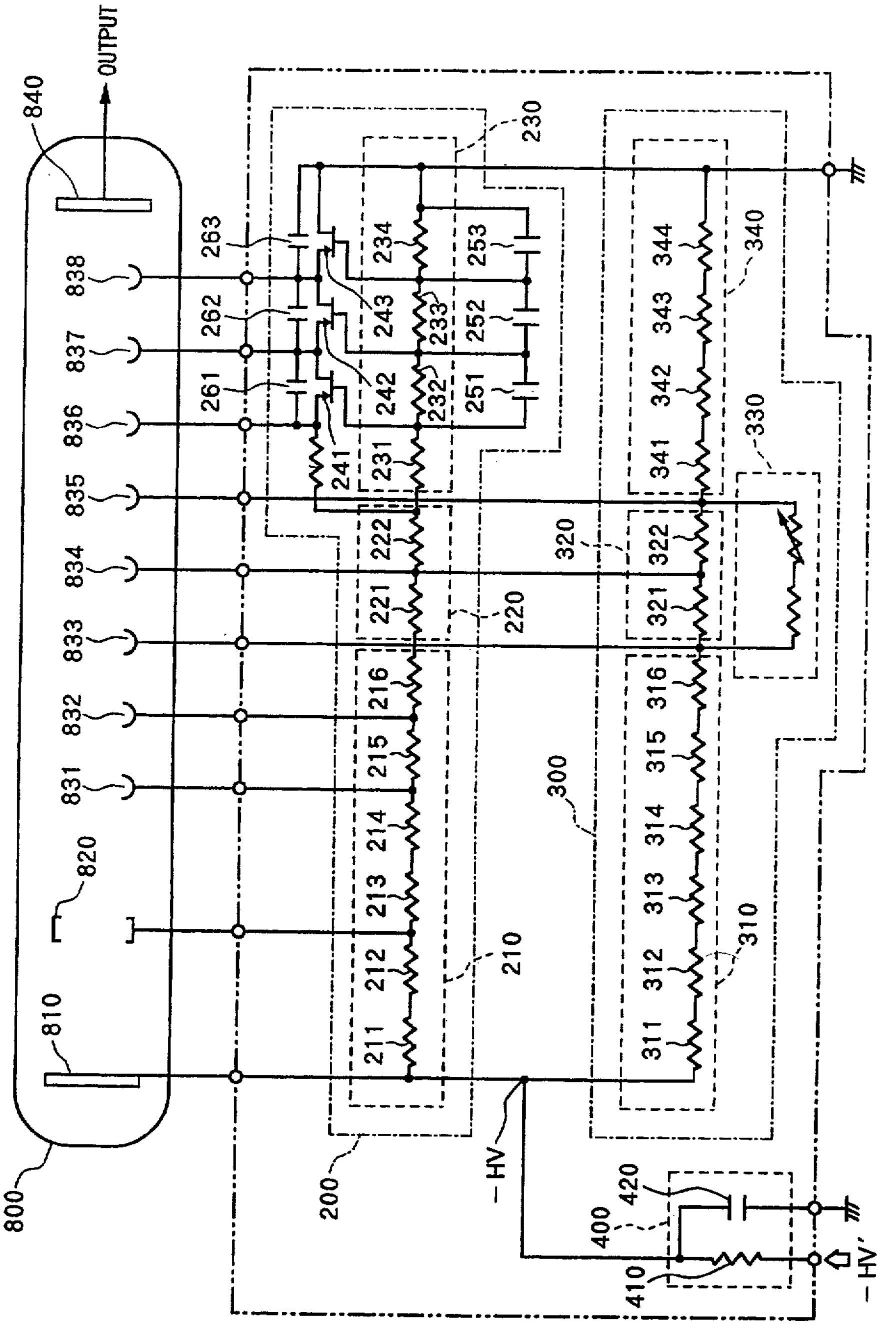

As shown in FIG. 3, this voltage division circuit includes a voltage division portion 150 and a voltage division portion 350. The voltage division portion 150 is inputted with the ground potential and the negative side potential of the negative high voltage supplied to the photocathode and outputs at a predetermined division ratio electric potential supplied to the focusing electrode 820, the dynodes 831, 832, the dynodes 834, and the dynodes 836 to 838. The voltage division portion 350 is inputted with the ground potential and the negative side potential of the negative high voltage and outputs a variable division ratio of the electric potential supplied to the dynodes 831, 835.

The voltage division circuit further includes a high voltage input portion 400 having a resistor element 410 and a bypass capacitor 420. The resistor element 410 has a first terminal to which the negative potential of the negative high voltage (−HV') is applied from an external source, and a second terminal connected to the voltage division portion 150 and the voltage division portion 350. The bypass capacitor 420 has a first terminal connected to ground and a second terminal connected to the second terminal of the resistor element 410. It should be noted that the resistance value of the resistor element 410 is selected to be a value sufficiently smaller than the combined resistance of the resistance value of the voltage division portion 150 and the resistance value of the voltage division portion 350. As a result, when a high voltage (−HV') is applied to the voltage division circuit, then a high voltage (−HV) is applied between the photocathode and the anode. In the actuality, −HV=−HV'.

The voltage division portion 150 includes a first resistor array 160 having resistors 161 to 166 connected in series, a second resistor array 170 having resistors 171 to 172 connected in series, and a third resistor array 180 having resistors 181 to 184 connected in series. The first resistor array 160 has the first terminal electrically connected to the photocathode 810 and terminals electrically connected to the focusing electrode 820 and the dynodes 831, 832, respectively. The second resistor array 170 has a first terminal connected to the second terminal of the first resistor array 160, and second terminal. The third resistor array 180 has a first terminal connected to the second terminal of the second resistor array 170, a second terminal connected to ground, and terminals to be connected to the dynodes 836 to 838. The voltage division portion 180 further includes transient current supplying capacitors 191, 192 and 193 connected in parallel to corresponding ones of the resistors 182, 183, 184.

The voltage division portion 350 includes a first resistor array 360 having resistors 361 to 366 connected in series, a second resistor array 370 having resistors 371 and 372 connected in series, a variable resistor portion 380 connected in parallel to the second resistor array 370, and a resistor array 390 having resistors 391 through 394 connected in series. The first resistor array 360 has a first terminal electrically connected to the photocathode 810, and a second terminal. The second resistor array 370 has a first terminal connected to the second terminal of the first resistor array 360, and a second terminal. The second resistor array 370 has terminals electrically connected to the dynodes 833 to 835. The variable resistance portion 380 has a first terminal connected to the second terminal of the first resistor array 360. The third resistor array 390 has a first terminal connected to the second terminal of the variable resistance portion 380 and to the second terminal of the second resistor array 370. The second terminal of the third resistor array 390 is connected to ground.

The rheostat portion 380 formed from a resistor 381 and a rheostat portion 382 connected in series.

When a high voltage (−HV') is applied to the voltage division circuit, the high voltage (−HV) is applied between both terminals of the voltage division portion 150 and both terminals of the voltage division portion 350. The voltage division portion 150 and the voltage division portion 350 separately divide the high voltage (−HV).

The voltage division portion 150 divides the high voltage (−HV) in a fixed manner determined by the resistance values of the resistors 161 to 166, 171, 172, and 181 through 184. The voltage division portion 150 generates fixed potentials supplied to the focusing electrode 820, the dynodes 831, 832, and the dynodes 836 to 833. That is, assuming that the resistance value of the first resistor array 160 is R16, the resistance value of the second resistor array 170 is R17, and the resistance value of the third resistor array 180 is R18, then a voltage V16 developed between the terminals of the first resistor array 160, a voltage V17 developed between the terminals of the second resistor array 170, and a voltage V18 developed between the terminals of the third resistor array 180 are fixed values determined by the following equations.

$$V16=(-HV)\times R16/(R16+R17+R18) \quad (10)$$

$$V17=(-HV)\times R17/(R16+R17+R18) \quad (11)$$

$$V18=(-HV)\times R18/(R16+R17+R18) \quad (12)$$

The voltages V16, V17, and V18 are divided in a fixed manner by the first resistor array 160, the second resistor array 170, and the third resistor array 180.

As a result, a fixed voltage is developed between the photocathode 810 and the dynodes 831 which is the first-stage dynode nearest the photocathode 810. Thus, the dynode's collection efficiency can be maintained at a fixed level and the voltage developed between the photocathode 810 and the anode 840 can be also maintained at a fixed level. Therefore, electron multiplication can be carried out with a fixed range of linearity of the anode current.

The voltage division portion 350 also divides the high voltage. However, the voltage division portion 350 divides the voltage in a variable manner. That is, assuming the voltage value of the first resistor array 360 is R36, the combined resistance of the second resistor array 370 and the variable resistor portion 380 is R37, and the resistance value of the third resistor array 390 is R38, then a voltage V36 developed between the terminals of the first resistor array 360, a voltage V37 developed between the terminals of the second resistor array 370, and a voltage V38 developed between the terminals of the variable resistor portion 380 can be determined using the following equations.

$$V36=(-HV)\times R36/(R36+R37+R38) \quad (13)$$

$$V37=(-HV)\times R37/(R36+R37+R38) \quad (14)$$

$$V38=(-HV)\times R38/(R36+R37+R38) \quad (15)$$

Resistance value R32 varies by operation of the variable resistor portion 332. Accordingly, the voltages V36, V37, and V38 vary in accordance with equations (13) through (15).

As a result, a voltage VD23 between the dynode 832 and the dynode 833, a voltage VD24 between the dynode 833 and the dynode 834, a voltage VD45 between the dynode 834 and the dynode 835, and a voltage VD56 between the dynode 835 and the dynode 836, are all vary. By varying the voltage between the dynodes, the electron multiplication factor of the photomultiplier tube 800 varies.

By using the voltage division circuit as described above to supply voltage to the photomultiplier tube, by merely operating the variable resistor portion, the electron multiplication factor of the photomultiplier tube can be greatly changed without changing dynode's collection efficiency or the output linearity.

Further, because the voltage division portion 300 supplies voltage to the dynodes 833 to 835, which are middle stages along the accelerated multiplication pathway of the photomultiplier tube 800, the dynode current at a time of electron multiplication is small. Therefore, the value of the direct current resistance component of the voltage division portion 300 can be set to a relatively large value in order to maintain electric potential of the dynodes. Accordingly, increase in the consumed power caused by adding the voltage division portion 300 can be reduced.

In the third embodiment, because the dynodes 838 to 835 are set as the center steps in the second dynode portion, the dynode 834 was set as the dynode to which voltage division portion 150 supplies electric potential during fixed voltage division. However, generally, it is desirable to configure the circuit so that the voltage division portion 150 supplies electric potential to a Mth step dynode represented by the following formula:

$$M=(K+L)/2$$

wherein the Kth step to the Lth step dynodes are set as the second dynode portion.

It should be noted that the number of dynodes of the second dynodes portion to which the voltage division portion 150 supplies electric potential is not limited to 1. A plurality of dynodes omitting the Kth and Lth dynodes are possible.

It is possible to embody the present invention by modifying the first embodiment in the manner described in the second embodiment.

Although the present invention is not limited to the above-described embodiments and can be modified. For example, in the above-described embodiments, the number of dynodes in the photomultiplier tube was set to eight. However, the present invention can be applied to a photomultiplier with other numbers of dynodes provided thereto and still achieve the same effects as for achieved in the embodiments.

In the second embodiment, the FETs can be replaced with appropriate bipolar type transistors.

Further, although in the above-described embodiments, a negative high voltage was applied, the photocathode can be connected to the ground level and a positive high voltage can be applied to the anode side. It should be noted that in this case, a single output can be obtained from an anode via coupling capacitor.

As described above in detail, according to a voltage division circuit according to the present invention for use with a photomultiplier tube, a first voltage division portion for dividing voltage in a fixed manner based on a resistance value of components connected in series and a second voltage division portion for dividing voltage in a variable manner based on resistance values of components connected in series are connected together in parallel. The middle step dynodes of the photomultiplier pathway are supplied with an electric potential from the second voltage division portion. Therefore, by manipulating the second voltage division portion, an adjustable voltage division circuit for use with the photomultiplier tube can be provided wherein the electron multiplication rate of the photomultiplier tube is easily adjustable over a broad range with low power consumption and without effecting linearity of output or the dynode's collection efficiency of the photomultiplier tube.

What is claimed is:

1. A voltage division circuit for a photomultiplier tube which includes:

a photocathode which emits photoelectrons in response to light incident thereon;

a first dynode portion having at least one dynode, said first dynode portion receiving the photoelectrons emitted from said photocathode, multiplying the photoelectrons and emitting multiplied photoelectrons;

a second dynode portion having at least one dynode, said first dynode portion receiving the multiplied photoelectrons emitted from said first dynode portion, multiplying the multiplied photoelectrons and emitting further multiplied photoelectrons;

a third dynode portion having two or more dynodes, said third dynode portion receiving the multiplied photoelectrons emitted from said second dynode portion and emitting further multiplied photoelectrons; and an anode receiving the further multiplied photoelectrons emitted from said third dynode portion, a voltage division circuit which supplies relevant voltages to said photocathode, said first dynode portion, said second dynode portion, and said third dynode portion, comprising:

a first voltage division portion which is applied with a first side potential and a second side potential higher in voltage than the first side potential defining a high voltage and outputs voltages applied to said first dynode portion and said third dynode portion upon voltage dividing the high voltage at a predetermined voltage division ratio; and a second voltage division portion which is applied with the first side potential and the second side potential of the high voltage and outputs a voltage applied to said second dynode portion upon voltage dividing the high voltage at a variable voltage division ratio.

2. The voltage division circuit according to claim 1, wherein said first voltage division portion comprises:

a first resistor array having a first number of resistors connected in series, said first resistor array having a first terminal connected to said photocathode, a second terminal, and at least one terminal connected to said at least one dynode in said first dynode portion;

a second resistor array having a second number of resistors connected in series, said second resistor array having a first terminal connected to said second terminal of said first resistor array, and a second terminal; and a third resistor array having a third number of resistors connected in series, said third resistor array having a first terminal connected to the second terminal of said second resistor array, terminals connected respectively to the two or more dynodes of said third dynode portion, and a second terminal connected to the second side potential of the high voltage.

3. The voltage division circuit according to claim 1, wherein said first voltage division portion comprises:

a first resistor array having a first number of resistors connected in series, said first resistor array having a first terminal connected to said photocathode, a second terminal, and at least one terminal connected to said at least one dynode in said first dynode portion;

a second resistor array having a second number of resistors connected in series, said second resistor array having a first terminal connected to said second terminal of said first resistor array, and a second terminal;

a third resistor array having a third number of resistors connected in series, said third resistor array having a first terminal connected to the second terminal of said second resistor array, and a second terminal connected to the second side potential of the high voltage; and a predetermined number of transistors which pass a voltage developed across said third dynode portion and voltages determined by said third resistor array to a predetermined number of dynodes closer in position to said anode, said predetermined number of transistors bypassing currents flowing in said predetermined number of dynodes.

4. The voltage division circuit according to claim 3, wherein said predetermined number of transistors are bipolar transistors.

5. The voltage division circuit according to claim 3, wherein said predetermined number of transistors are field effect transistors.

6. The voltage division circuit according to claim 1, wherein said second voltage division portion comprises:

a fourth resistor array having the first number of resistors connected in series, said fourth resistor array having a first terminal connected to said photocathode, and a second terminal;

a fifth resistor array having the second number of resistors connected in series, said fifth resistor array having a first terminal connected to said second terminal of said fourth resistor array, terminals connected to said at least one dynode in said second dynode portion, and a second terminal;

a variable resistor portion having a first terminal connected to the second terminal of said fourth resistor array, and a second terminal, said variable resistor portion being connected in parallel to said fifth resistor array; and a sixth resistor array having the third number of resistors connected in series, said sixth resistor array having a first terminal connected to both the second terminal of said fifth resistor array and the second terminal of said variable resistor portion, and a second terminal connected to the second side potential of the high voltage.

7. A voltage division circuit for a photomultiplier tube which includes:

a photocathode which emits photoelectrons in response to light incident thereon;

a first dynode portion having at least one dynode, said first dynode portion receiving the photoelectrons emitted from said photocathode, multiplying the photoelectrons and emitting multiplied photoelectrons;

a second dynode portion having at least three dynode, said first dynode portion receiving the multiplied photoelectrons emitted from said first dynode portion, multiplying the multiplied photoelectrons and emitting further multiplied photoelectrons;

a third dynode portion having two or more dynodes, said third dynode portion receiving the multiplied photoelectrons emitted from said second dynode portion and emitting further multiplied photoelectrons; and an anode receiving the further multiplied photoelectrons emitted from said third dynode portion, the voltage division circuit which supplies relevant voltages to said photocathode, said first dynode portion, said second dynode portion, and said third dynode portion, comprising:

a first voltage division portion which is applied with a first side potential and a second side potential higher in voltage than the first side potential defining a high voltage and outputs voltages applied to said first dynode portion, said third dynode portion, and more than one predetermined dynodes in said second dynode portion excluding a first-stage dynode and a final-stage dynode in said second dynode portion upon voltage dividing the high voltage at a predetermined voltage division ratio; and a second voltage division portion which is applied with a voltage output from said first voltage division portion and the second side potential of the high voltage and outputs voltages applied to dynodes in said second dynode portion other than said more than the predetermined dynodes upon voltage dividing the high voltage at a variable voltage division ratio.

8. The voltage division circuit according to claim 7, wherein said first voltage division portion generates a voltage applied to a dynode disposed substantially at a center in said second dynode portion.

9. The voltage division circuit according to claim 7, wherein said first voltage division portion comprises:

a first resistor array having a first number of resistors connected in series, said first resistor array having a first terminal connected to said photocathode, a second terminal, and at least one terminal connected to said at least one dynode in said first dynode portion;

a second resistor array having a second number of resistors connected in series, said second resistor array having a first terminal connected to said second terminal of said first resistor array, a terminal connected to the predetermined dynode in said second dynode portion, and a second terminal; and a third resistor array having a third number of resistors connected in series, said third resistor array having a first terminal connected to the second terminal of said second resistor array, terminals connected respectively to the two or more dynodes of said third dynode portion, and a second terminal connected to the second side potential of the high voltage.

10. The voltage division circuit according to claim 7, wherein said first voltage division portion comprises:

a first resistor array having a first number of resistors connected in series, said first resistor array having a first terminal connected to said photocathode, a second terminal, and at least one terminal connected to said at least one dynode in said first dynode portion;

a second resistor array having a second number of resistors connected in series, said second resistor array having a first terminal connected to said second terminal of said first resistor array, a terminal connected to the predetermined dynode in said second dynode portion, and a second terminal;

a third resistor array having a third number of resistors connected in series, said third resistor array having a first terminal connected to the second terminal of said second resistor array, and a second terminal connected to the second side potential of the high voltage; and a predetermined number of transistors which pass a voltage developed across said third dynode portion and voltages determined by said third resistor array to a predetermined number of dynodes closer in position to said anode, said predetermined number of transistors bypassing currents flowing in said predetermined number of dynodes.

11. The voltage division circuit according to claim 10, wherein said predetermined number of transistors are bipolar transistors.

12. The voltage division circuit according to claim 10, wherein said predetermined number of transistors are field effect transistors.

13. The voltage division circuit according to claim 7, wherein said second voltage division portion comprises:

a fourth resistor array having the first number of resistors connected in series, said fourth resistor array having a first terminal connected to said photocathode, and a second terminal;

a fifth resistor array having the second number of resistors connected in series, said fifth resistor array having a first terminal connected to said second terminal of said fourth resistor array, terminals connected to dynodes in said second dynode portion other than said predetermined dynode, and a second terminal;

a variable resistor portion having a first terminal connected to the second terminal of said fourth resistor array, and a second terminal, said variable resistor portion being connected in parallel to said fifth resistor array; and a sixth resistor array having the second number of resistors connected in series, said sixth resistor array having a first terminal connected to both the second terminal of said fifth resistor array and the second terminal of said variable resistor portion, and a second terminal connected to the second side potential of the high voltage.

* * * * *

UNITED STATES PATENT AND TRADEMARK OFFICE

CERTIFICATE OF CORRECTION

PATENT NO. : 5,880,457

DATED : March 9, 1999

INVENTOR(S) : TOMITAMA, KIMIYUKI, EMA, TSYOSHI

It is certified that error appears in the above-identified patent and that said Letters Patent is hereby corrected as shown below:

IN THE DRAWINGS:

Please replace Fig. 2 with the attached Fig. 2.

Signed and Sealed this

Ninth Day of May, 2000

Attest:

Q. TODD DICKINSON

*Attesting Officer*

*Director of Patents and Trademarks*